United States Patent [19]

Lew et al.

[11] Patent Number: 4,872,360
[45] Date of Patent: Oct. 10, 1989

[54] MOVING CYLINDER ACTUATOR

[76] Inventors: Hyok S. Lew; Hyon S. Lew, both of 7890 Oak St., Arvada, Colo. 80005

[21] Appl. No.: 192,835

[22] Filed: May 12, 1988

[51] Int. Cl.$^4$ .................. F16H 21/44; F16H 27/02; F01B 15/02
[52] U.S. Cl. .................................. 74/110; 74/89.17; 92/117 A
[58] Field of Search .............. 74/89.17, 33, 110, 29, 74/30; 92/117 R, 117 A

[56] References Cited

U.S. PATENT DOCUMENTS

| | | | |
|---|---|---|---|
| 577,342 | 2/1897 | Bain | 92/117 R X |
| 994,627 | 6/1911 | Workman | 74/29 |
| 2,404,639 | 7/1946 | Lane | 74/89.17 X |
| 3,202,000 | 8/1965 | Fischer | 92/117 R |
| 3,772,966 | 11/1973 | Mills | 92/117 R X |
| 4,141,432 | 2/1979 | Presley | 92/117 A X |
| 4,178,838 | 12/1979 | Stafford | 92/117 A |
| 4,456,077 | 6/1984 | Lagerstedt et al. | 92/117 R X |

Primary Examiner—Leslie A. Braun
Assistant Examiner—Janice E. Chartoff

[57] ABSTRACT

The actuator of the present invention comprises a cylinder with a circular cylindrical cavity slidably engaged by a stationary piston secured to the frame of the actuator by at least one rod extending through one end wall of the circular cylindrical cavity in a leak-proof manner, wherein the stationary piston divides the circular cylindrical cavity into two compartments in a leak-proof manner. Pressurizing one and venting the other of the two compartments moves the cylinder relative to the stationary piston. The outer cylindrical surface of the cylinder includes fastening device for securing an object to be linearly actuated thereto or rack engaging a pinion gear that converts the linear motion of the cylinder to a linear motion of a sliding member with another rack or to a rotary motion of the pinion gear shaft.

2 Claims, 2 Drawing Sheets

MOVING CYLINDER ACTUATOR

BACKGROUND OF THE INVENTION

There are two kinds of linear actuator cylinders. The first kind is the conventional combination of the stationary cylinder and moving piston with connecting rod extending through one end wall of the cylinder. The second kind is the actuator known as the "rodless actuator cylinder" comprising a connecting member disposed adjacent to the cylindrical side of the cylinder that reciprocates following the cylindrical wall of the cylinder. While there are a number of different designs and constructions for the existing "rodless cylinders", none of the existing versions is capable of operating on a high pressure source such as an ultra-high pneumatic pressure source or hydraulic pressure source and of delivering a high power actuation with structural rigidity and strength.

BRIEF SUMMARY OF THE INVENTION

The primary object of the present invention is to provide a pseudo-rodless actuator cylinder which operates like a true rodless actuator cylinder while it comprises a rod in actuality.

Another object is to provide an actuator cylinder comprising a moving cylinder with a circular cylindrical cavity slidably engaged by a stationary piston fixed to a rod extending through one end wall of the circular cylindrical cavity wherein the rod is secured to a stationary frame of the actuator.

A further object is to provide a moving cylinder actuator with connecting means affixed to the outer cylindrical surface of the moving cylinder.

Yet another object is to provide a moving cylinder actuator with a rack affixed to the outer cylindrical surface of the moving cylinder, which rack engages a pinion gear engaging another rack included in a reciprocating connector member disposed parallel to the actuator cylinder.

Yet a further object is to provide a moving cylinder actuator with a rack affixed to the outer cylindrical surface of the moving cylinder, which rack engages a pinion gear nonrotatably mounted to a rotating shaft.

Still another object is to provide a rotary actuator comprising a pinion gear driven by a pair of racks respectively affixed to two moving cylinders reciprocating in two opposite directions therebetween.

Still a further object is to provide a moving cylinder actuator with a rugged construction, that is compatible with a very high pressure source and delivers high powered actuation.

These and other objects of the present invention will become clear as the description thereof progresses.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
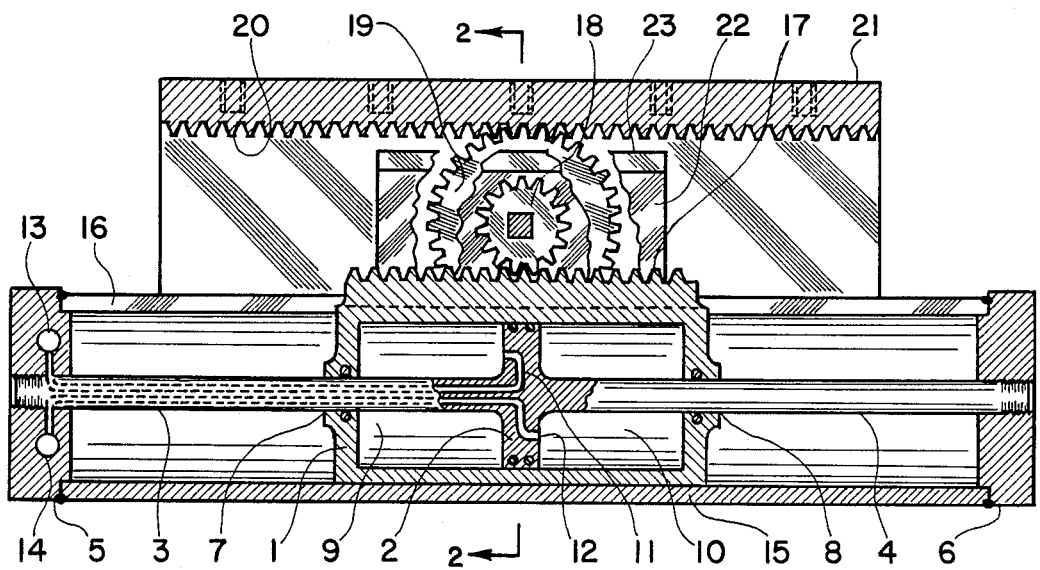
FIG. 1 illustrates a cross section of an embodiment of the moving cylinder actuator of the present invention that provides linear actuating motions.

In FIG. 1 there is illustrated a cross section of an embodiment of the moving cylinder actuator of the present invention, that provides linear actuating motions of an extended stroke. The moving cylinder 1 has a circular cylindrical cavity which is slidably engaged by a stationary piston 2 in a leak-proof manner. A pair of rods 3 and 4 rigidly extending from the two opposite end faces of the stationary piston 2 respectively extend through the two holes 7 and 8 included in the two end walls of the moving cylinder 1 in a leak-proof and sliding relationship and are anchored to the end blocks 5 and 6 of the actuator frame at the extremities thereof. The stationary piston 2 divides the circular cylindrical cavity in the moving cylinder 1 into two compartments 9 and 10. The first fluid passage 11 included in the rod 3 connects the first port 13 to the first compartment 9, while the second fluid passage 12 included in the rod 3 connects the second port 14 to the second compartment 10. The two end blocks 5 and 6 are tied to one another by a hollow cylinder 15 including a slitted opening 16. The outer surface of the cylindrical wall of the moving cylinder 1 includes a rack 17, which engages a pinion gear 18 nonrotatably mounted on a shaft rotatably supported by a lateral extension 22 of the tie cylinder 15. A pair of gears 19 are also nonrotatably mounted on the same shaft including the pinion gear 18, which pair of gears 19 engages a pair of racks 20 included in a sliding block or member 21 retained and guided by a dove tail guide slide 23 included in the lateral extension 22 of the tie cylinder 15.

Figure 2:
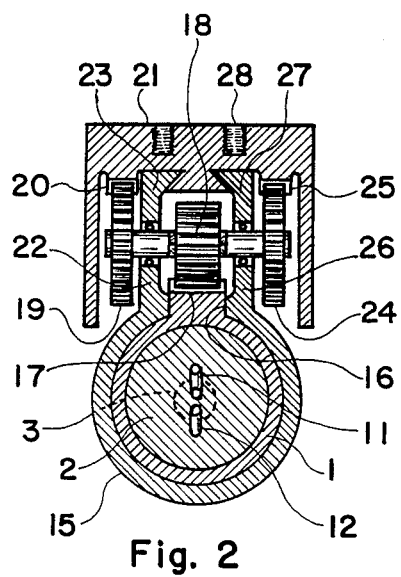
FIG. 2 illustrates another cross section of the embodiment shown in FIG. 1.

In FIG. 2 there is illustrated another cross section of the embodiment shown in FIG. 2, which cross section is taken along plane 2—2 as shown in FIG. 1. It is notable that the reciprocating motions of the moving cylinder 1 is guided by the rods 3 and 4 as well as by the inner cylindrical surface of the tie cylinder 15. The rack 17 engaging the pinion gear 18 is included in a bar that is affixed to the outer cylindrical surface of the moving cylinder 1 and engaging the slitted opening 16 of the tie cylinder 15 in a sliding relationship. The shaft including the pinion gear 18 and the pair of gears 19 and 24 are rotatably supported by a pair of lateral extensions 22 and 26 extending from the tie cylinder 15 in a lateral direction. The sliding block or member 21 including a pair of racks 20 and 25 respectively engaging by the pair of gears 19 and 24 is retained and guided by a dove tail slide comprising the tapered edges 23 and 27 of the lateral extensions 22 and 26. The sliding block or member 21 includes threaded holes 28 for anchoring objects requiring actuations thereto.

The moving cylinder actuator illustrated in FIGS. 1 and 2 operates on the following principles; supplying and venting of the pressurized fluid through the ports 13 and 14 pressurizes one compartment and vents the other compartment separated from one another by the stationary piston 2, that generates a linear movement of the cylinder 1 and rotates the pinion gear 18 and the pair of gears 19 and 24, which in turn moves the sliding block or member 21. By employing an appropriate ratio of the pitch diameters between the pinion gear 18 and the pair of gears 19 and 24, the stroke of the reciprocating motion or the actuating thrust provided by the sliding block 21 can be adjusted to a required value. It should be understood that only one of the two combinations of the gears and racks 19-20 and 24-25 may be employed for applications which do not require a great deal of thrust and power from the moving cylinder actuator.

Figure 4:
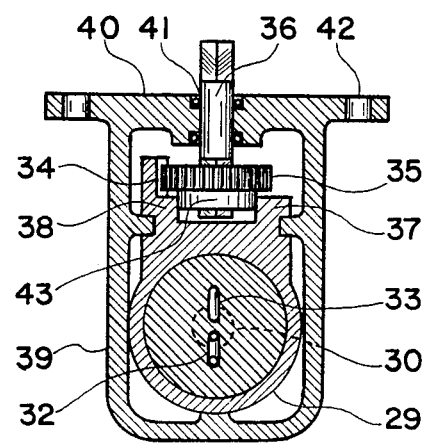
FIG. 4 illustrates another cross section of the embodiment shown in FIG. 3.
Figure 3:
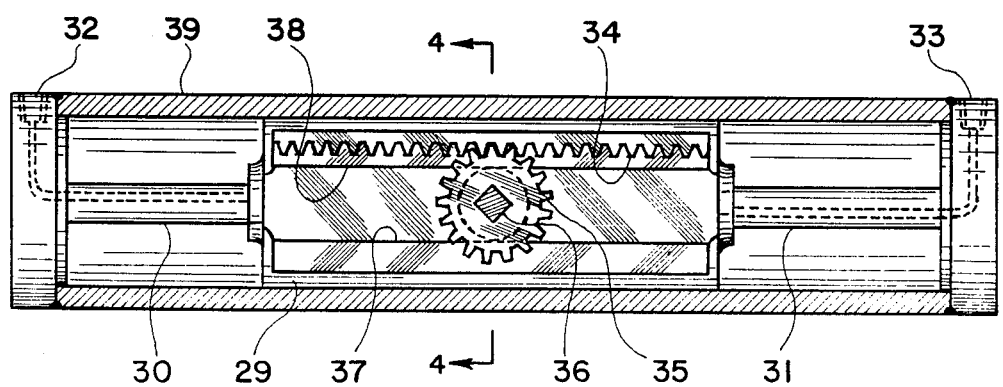
FIG. 3, illustrates a cross section of another embodiment of the moving cylinder actuator of the present invention that provides a rotary actuating motion.

In FIG. 3 there is illustrated a cross section of another embodiment of the moving cylinder actuator of the present invention, that provides rotary actuating motions. The moving cylinder 29 including a stationary piston supported by a pair of rods 30 and 31 includes a rack 34 that engages a pinion gear 35 nonrotatably mounted on a shaft 36 providing rotary actuations. The structure including rack 34 may include a pair of guide surfaces 37 and 38 as shown in FIG. 4. The fluid passages 32 and 33 respectively open to the two compartments in the moving cylinder may be routed through two separate end blocks tied to one another by a tie cylinder 39.

In FIG. 4 there is illustrated another cross section of the embodiment shown in FIG. 3, which cross section is taken along plane 4—4 as shown in FIG. 3. The moving cylinder 29 is guided by the rods 30 and 31 as well as by the plurality of linear guide rails included in the inner cylindrical surface of the tie cylinder 39. The shaft 36 is rotatably supported by the bearings 41 secured to the flange 40 affixed to the tie cylinder 39, which flange 40 includes bolt holes 42 for mounting. The pinion gear 35 includes a circular cylindrical end 43 that is guided by the pair of guide rails 37 and 38 constructed in an integral structure that also includes the rack 34 driving the pinion gear 35.

Figure 5:
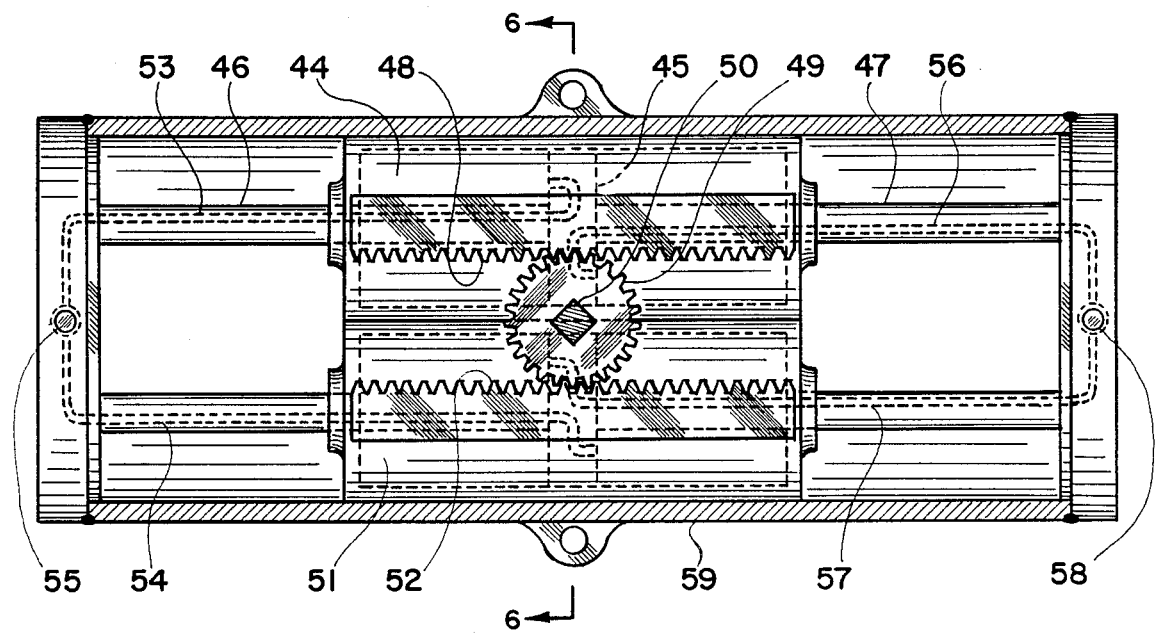
FIG. 5 illustrates an embodiment of a rotary actuator comprising a pair of moving cylinder actuators.

In FIG. 5 there is illustrated a cross section of a rotary actuator powered by a pair of moving cylinders. The first moving cylinder 44 includes a stationary piston 45 supported by a pair of rods 46 and 47 respectively including fluid passages 53 and 56 open to the two compartments in the moving cylinder 44, respectively. The first moving cylinder 44 includes a rack 48 engaging a pinion gear 49 nonrotatably mounted on a shaft 50. The second moving cylinder 51 having the same construction as that of the first moving cylinder 44 is disposed next to the first moving cylinder 44 in a parallel arrangement, wherein the rack 52 included in the second moving cylinder also engages the pinion gear 49 disposed intermediate the two racks 48 and 52. The fluid passages 53 and 54 extending from the first port 55 are open to the first compartment in the first moving cylinder 44 and to the second compartment in the second moving cylinder 51, respectively, while the fluid passages 56 and 57 extending from the second port 58 are open to the second compartment in the first moving cylinder 44 and to the first compartment of the second moving cylinder 51. Therefore, the two moving cylinders move in two opposing directions when one port is pressurized and the other port is vented and, consequently, they rotate the pinion gear 49 by exerting a couple thereto. The tie cylinder 59 connecting the two end blocks also guides the motion of the moving cylinders as shown in FIG. 6.

Figure 6:
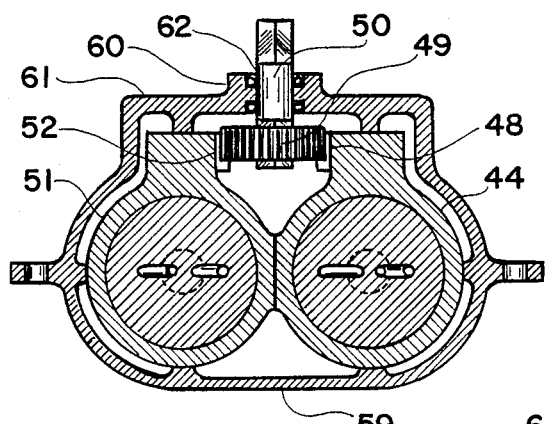
FIG. 6 illustrates a cross section of the embodiment shown in FIG. 5.

In FIG. 6 there is illustrated another cross section of the embodiment shown in FIG. 5, which cross section is taken along plane 6—6 as shown in FIG. 5. The pinion gear 49 driven by the pair of racks 48 and 52 is nonrotatably mounted on the shaft 50 that is rotatably supported by the bearings 62 secured to a hub 60 of a flange 61 affixed to the hollow cylinder 59 connecting the two end blocks including the two ports 55 and 58. The motions of the two moving cylinders are guided by a plurality of guide rails included in the inner cylindrical surfaces of the tie cylinder 59.

Figure 7:
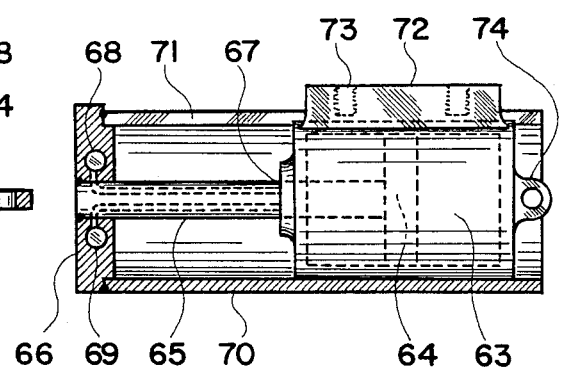
FIG. 7 illustrates an embodiment of the moving cylinder actuator including a stationary piston supported by a single rod.

In FIG. 7 there is illustrated a cross section of an embodiment of the moving cylinder linear actuator of the present invention, that has the simplest construction. The moving cylinder 63 includes a stationary piston 64 supported by a single rod 65 extending through a hole 67 included in one end wall of the moving cylinder 63, which rod 65 is anchored to the end block 66. The hollow cylindrical guide 70 with a slitted opening 71 is affixed to the end block 66 and extends therefrom. The other end wall of the moving cylinder 63 includes a connection means 74 for connecting an object requiring an end-connected actuation. The cylindrical side of the moving cylinder 63 includes a connector block 72 including threaded holes 73, that engages the slitted opening 71 in a sliding relationship. The two fluid passages respectively extending from the two ports 68 and 69 included in the end block 66 are open to the two compartments in the moving cylinder 63 respectively.

Figure 8:
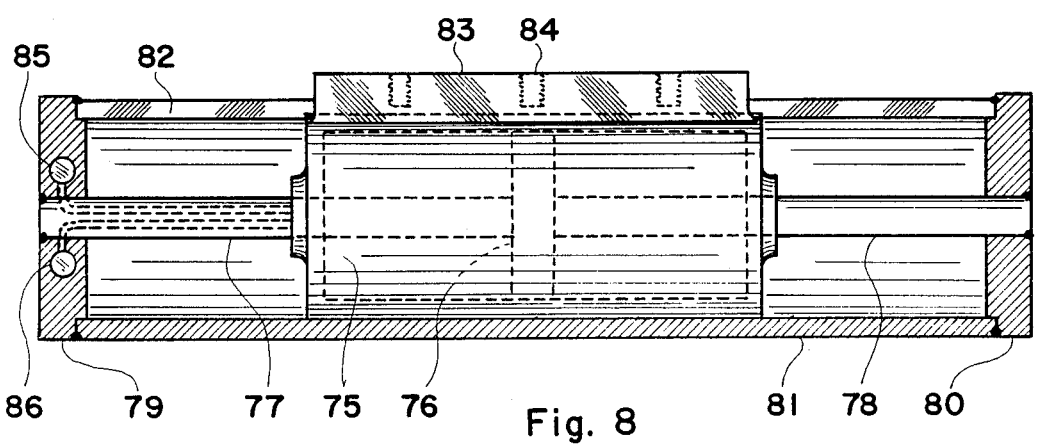
FIG. 8 illustrates an embodiment of the moving cylinder actuator including a stationary piston supported by a pair of rods.

In FIG. 8 there is illustrated a cross section of another embodiment of the moving cylinder linear actuator of a simple construction. The cavity in the moving cylinder 75 is engaged by a stationary piston 76 supported by a pair of rods 77 and 78 extending from two opposite faces of the stationary piston, which rods 77 and 78 are anchored to two end blocks 79 and 80 tied to one another by a tie cylinder 81 which includes a slitted opening 82 engaged by the connector block 83 with threaded holes 84 in a sliding relationship. The slide block 83 is affixed to the cylindrical surface of the moving cylinder 75. The two fluid passages respectively extending from the two ports 85 and 86 are open to the two compartments in the moving cylinder, respectively.

It should be mentioned that the moving cylinder actuator of the present invention may include a bellow or folding diaphragm anchored to a disc separating the two compartments in the moving cylinder in place of the piston with seal shown in the particular illustrated embodiments. As the use of the bellow or folding diaphragm in place of the piston with seal is a matter of design well known in the art of actuator cylinders, illustrative embodiments showing the construction employing the bellow or folding diaphragm in place of the piston with seal is not shown for the sake of the brevity.

While the principles of the present inventions have now been made clear by the illustrative embodiments, there will be immediately obvious to those skilled in the art many modifications of the structure, arrangements, proportions, elements and materials which are particularly adapted to the specific working environments and operating conditions in the practice of the invention without departing from those principles. It is not desired to limit the inventions to the particular illustrated embodiments shown and described and, accordingly, all suitable modifications and equivalents may be resorted to falling within the scope of the inventions as defined by the claims which follow.

The embodiment of the invention, in which an exclusive property or priviledge is claimed, are defined as follows:

1. An actuator cylinder comprising in combination:
   (a) a cylinder including a cylindrical cavity of a constant cross section;
   (b) a partitioning member engaging said cylindrical cavity in a sliding relationship and dividing said cylindrical cavity into a first and second compartment in a leak-proof manner;
   (c) at least one rod extending from one end face of said partitioning member in a direction parallel to a central axis of said cylindrical cavity and extending through one end wall of said cylindrical cavity in a leak-proof manner, wherein said rod is anchored to a supporting structure at the extremity thereof;
   (d) a first port connected to a first flow passage included in said rod and open to said first compartment in the cylinder;
   (e) a second port connected to a second flow passage included in said rod and open to said second compartment in the cylinder;
   (f) a first rack disposed parallel to the central axis of said cylindrical cavity and affixed to an outer cylindrical surface of said cylinder;
   (g) a pinion gear rotatably supported by the support structure and engaged by said first rack, wherein said pinion gear rotates at least another gear having a pitch diameter different from a pitch diameter of said pinion gear; and
   (h) a sliding member with fastening means guided and supported by the support structure in a sliding relationship in directions parallel to the central axis of said cylindrical cavity, said sliding member including a second rack engaged by said another gear.

2. An actuator cylinder comprising in combination:
   (a) a cylinder including a cylindrical cavity of a constant cross section;
   (b) a partitioning member engaging said cylindrical cavity in a sliding relationship and dividing said cylindrical cavity into a first and second compartment in a leak-proof manner;
   (c) two rods respectively extending from two opposite end faces of said partitioning member in two opposite directions parallel to a central axis of said cylindrical cavity and respectively extending through two end walls of said cylindrical cavity in a leak-proof manner, wherein said two rods are anchored to a support structure at the extremities thereof;
   (d) a first port connected to a first flow passage included in one of said two rods and open to said first compartment in the cylinder;
   (e) a second port connected to a second flow passage included in one of said two rods and open to said second compartment in the cylinder;
   (f) a first rack disposed parallel to the central axis of said cylindrical cavity and affixed to an outer cylindrical surface of said cylinder.
   (g) a pinion gear rotatably support by the support structure and engaged by said first rack, wherein said pinion gear rotates at least another gear having a pitch diameter different from a pitch diameter of said pinion gear; and
   (h) a sliding member with fastening means guided and supported by the support structure in a sliding relationship in directions parallel to the central axis of said cylindrical cavity, said sliding member including a second rack engaged by said another gear.

* * * * *